May 2, 1961 R. LUCIEN 2,982,500
RETRACTABLE LANDING GEAR
Filed Sept. 24, 1959 2 Sheets-Sheet 2

2,982,500
RETRACTABLE LANDING GEAR

Rene Lucien, Neuilly-sur-Seine, France

Filed Sept. 24, 1959, Ser. No. 842,117

Claims priority, application France Oct. 9, 1958

4 Claims. (Cl. 244—102)

The present invention relates to retractable landing gear for aircraft.

Landing gear with levers which retract during the course of lifting by relative rotation of a wheel rocking lever are known, for example, from U.S. application No. 505,699, now abandoned, filed on May 3, 1955, in the name of the present applicant. On the other hand, landing gear with director bars are known, for example from U.S. Patent Nos. 2,109,427 and 2,123,113.

The present invention relates to the combination of these two systems with each other, and with further means to obtain a new landing gear in which the wheel or wheels are lifted in an almost vertical trajectory, and are retracted into a very small housing.

Figure 1:
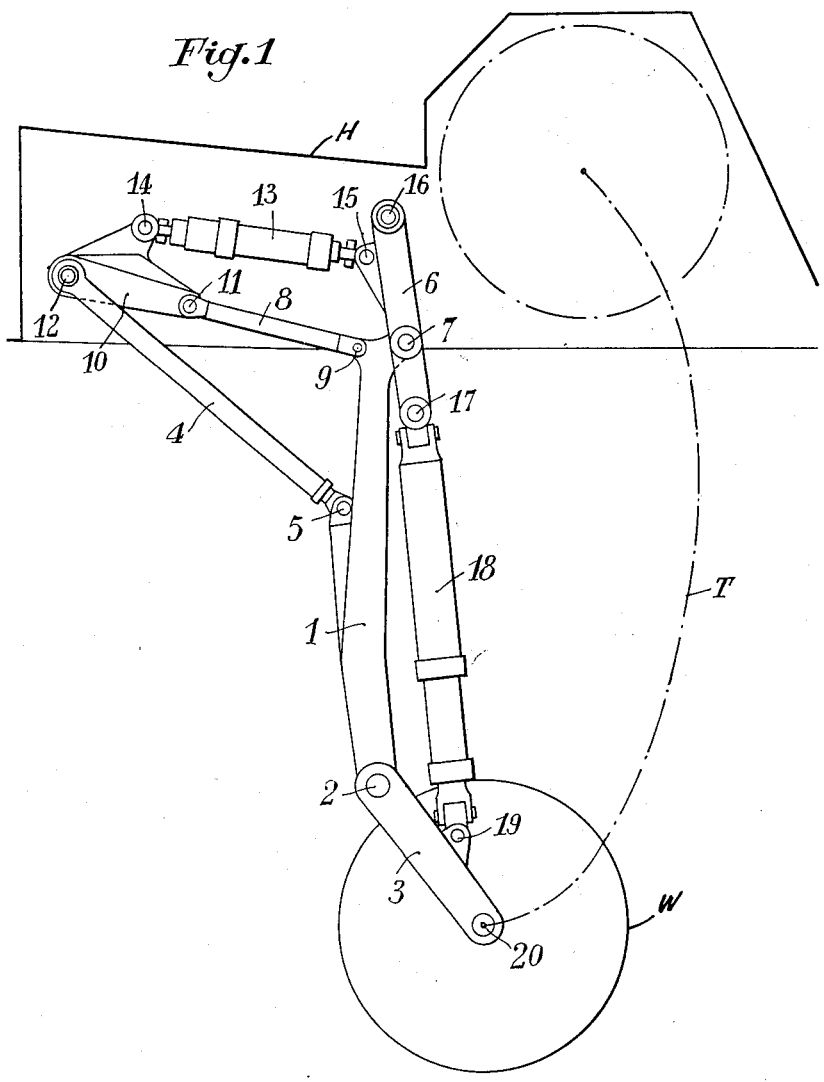

The landing gear shown in the wheels-down position in Fig. 1 is a landing gear with two concentric wheels. It employs the two systems referred to above to form a unit coupled to the aircraft solely by two parallel shafts. It is essentially composed of the following members, the shafts of which are parallel to each other:

The leg casing 1 is provided at its lower part with the pivot shaft 2 coupling thereto a rocking lever 3. At its central part, the casing 1 is coupled to a steering bar 4 by a shaft 5. The upper part of the casing 1 is coupled to a leg panel 6 by a pivot shaft 7 and to an arm 8 by a pivot shaft 9. A breaking strut comprises, in addition to the arm or strut 8, a strut casing 10 to which the arms are fixed by shafts 11. The strut casing 10 is pivoted to the steering bar 4 by the pivot shaft 12 of the steering bar on the aircraft. In the wheels-down position, the shafts 9, 11 and 12 are in the same plane and are so maintained, either by a double-acting lifting jack 13 provided with locking dogs (not shown) for that purpose, or by an actual locking of the strut. The double-acting lifting jack 13 is attached on the one hand to the strut-casing 10 by a shaft 14, and on the other hand to the leg panel 6 by a shaft 15.

The leg panel 6 is pivoted to the aircraft at its upper part by a shaft 16. Below the attachment 7 of the casing, an extension of this panel supports the attachment 17 of a shock-absorber 18. This attachment is a Cardan joint, as is also the attachment 19 of the shock-absorber to the rocking-lever 3.

This rocking-lever 3 has passing through it at its lower extremity an axle 20 on which are mounted the wheels W which are equipped with brakes (not shown).

Figure 2:
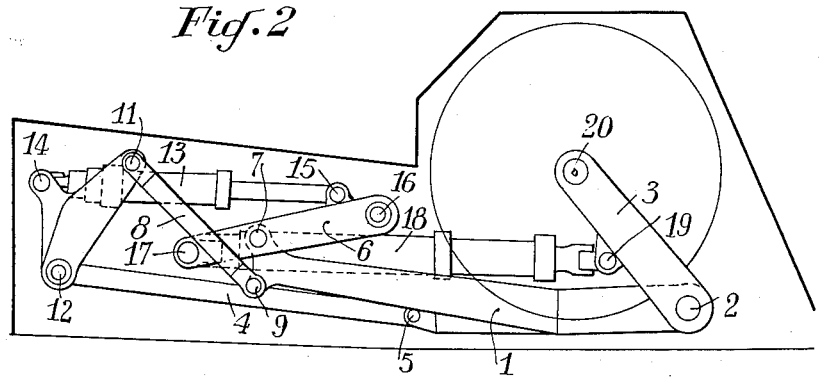

The lifting of the landing gear thus described is effected by sending oil at high pressure into the lifting jack 13. Fig. 2 shows the landing gear in the wheels-up position. In Fig. 1 is shown the trajectory T described by the center of the wheel; the extreme positions are almost on the same vertical line. The housing H for the landing gear is very small compared with the size of the landing gear when down.

Figure 3:
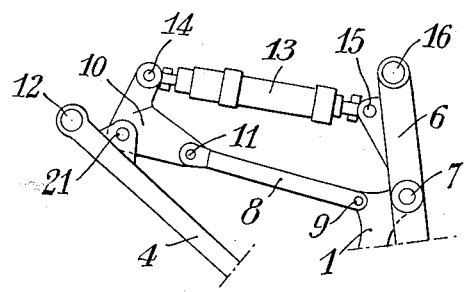

The present invention provides a different arrangement, shown in Fig. 3, for the strut casing 10. This latter is pivoted to the steering bar 4, not by the articulation shaft 12 as in Figs. 1 and 2, but by a shaft 21 located between the ends of the steering bar 4.

Figure 4:
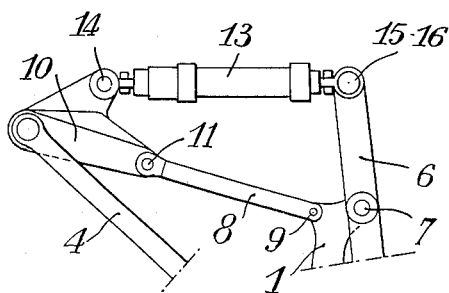

The present invention also provides a different arrangement, shown in Fig. 4, for the lifting jack 13. This latter is pivoted to the leg panel 6 by a shaft 15 coaxial with the pivot shaft 16 on the aircraft.

The landing gear according to the present invention has the following main advantages:

(1) The trajectory of the wheels is almost vertical;

(2) The space occupied by the landing gear when retracted is very small compared with the size of the landing gear when down.

(3) The fixing on the aircraft by two parallel shafts is simple;

(4) It is possible to use the landing gear on aircraft for all kinds of ground, by virtue of its shock-absorber with lever arms.

The first two advantages in particular enable this landing gear to be housed in an engine nacelle in a very simple manner and in a very small space.

What is claimed is:

1. A retractable landing gear for an aircraft having wheels supported on a shaft and comprising a rocking-lever element having an extremity pivoted on the shaft of the wheels, a leg casing element having an extremity pivoted to said rocking-lever element, a leg panel element having an extremity pivoted to said aircraft and being further pivoted to said leg casing element, a shock-absorber element having an extremity pivoted to said leg panel element and having another extremity pivoted to said rocking-lever element, a steering bar element having an extremity pivoted to said aircraft and having another extremity pivoted to said leg casing element, a strut element having an extremity pivoted to said leg casing element, a strut casing element having an extremity pivoted to said strut element and having another extremity pivoted to said steering bar element, and a double-acting jack element having an extremity pivoted to said strut casing element, and having another extremity pivoted to said leg panel element, said elements being pivotally connected for movement about axes parallel to the shaft of said wheels.

2. A landing gear as claimed in claim 1, comprising coaxial means pivotally connecting said strut casing element to said steering bar element and said strut element to said aircraft.

3. A landing gear as claimed in claim 1, comprising coaxial means pivotally connecting said jack element to said leg panel element and said leg panel element to the aircraft.

4. A landing gear as claimed in claim 1, comprising coaxial means pivotally connecting said strut casing element to said steering bar element and said strut element to the aircraft, and coaxial means pivotally connecting said jack element to said leg panel element and said leg panel element to the aircraft.

References Cited in the file of this patent

UNITED STATES PATENTS 2,589,434     Robert _____ Mar. 18, 1952

FOREIGN PATENTS 720,194     Germany _____ Apr. 28, 1942